United States Patent
Mercier

(10) Patent No.: US 6,543,731 B1
(45) Date of Patent: Apr. 8, 2003

(54) CONDUIT BRACKET SYSTEM

(76) Inventor: John Mercier, P.O. Box 333, Cuddy, PA (US) 15031

(*) Notice: Subject to any disclaimer, the term of this patent is extended or adjusted under 35 U.S.C. 154(b) by 0 days.

(21) Appl. No.: 10/059,970

(22) Filed: Jan. 30, 2002

(51) Int. Cl.[7] .............................................. E21F 17/02
(52) U.S. Cl. .................. 248/62; 248/56; 248/57; 248/68.1; 248/58; 248/49; 52/677; 52/682; 403/346; 403/400; 403/207; 285/64; 285/61; 211/105.1; 211/89.1
(58) Field of Search ....................... 248/57, 56, 200.1, 248/68.1, 58, 67.7, 512, 62, 74.2, 49, 53, 316.7, 231.81; 403/346, 400, 207; 285/64, 61; 211/94.01, 105.1, 89.1; 52/677, 682, 684, 686, 426, 562

(56) References Cited

U.S. PATENT DOCUMENTS

| | | | | | |
|---|---|---|---|---|---|
| 1,176,255 A | * | 3/1916 | Spaulding | ..................... | 249/20 |
| 1,206,203 A | * | 11/1916 | Brockway | ..................... | 248/49 |
| 1,542,267 A | * | 6/1925 | Parker | ..................... | 248/49 |
| 1,905,596 A | * | 4/1933 | Lewis | ..................... | 248/49 |
| 2,250,732 A | * | 7/1941 | Svendsen | ..................... | 248/68 |
| 3,313,009 A | | 4/1967 | Beckerer | | |
| 4,356,986 A | * | 11/1982 | Lynch | ..................... | 248/57 |
| 4,598,519 A | * | 7/1986 | Reid | ..................... | 52/426 |
| 4,854,456 A | * | 8/1989 | Lee | ..................... | 211/14 |
| 5,107,648 A | * | 4/1992 | Roby | ..................... | 52/309.12 |
| 5,133,523 A | | 7/1992 | Daigle et al. | | |
| 5,429,330 A | * | 7/1995 | Bond et al. | ..................... | 248/61 |
| 5,595,260 A | * | 1/1997 | Jalla | ..................... | 182/3 |
| 5,662,297 A | * | 9/1997 | Christensen et al. | ..................... | 211/105.1 |
| 5,871,306 A | * | 2/1999 | Tilcox | ..................... | 405/157 |
| 5,906,341 A | * | 5/1999 | Brown | ..................... | 248/49 |

FOREIGN PATENT DOCUMENTS

| | | |
|---|---|---|
| FR | 1327283 | 4/1963 |
| GB | 927731 | 6/1963 |
| GB | 1270242 | 4/1972 |
| GB | 1415691 | 11/1975 |

* cited by examiner

*Primary Examiner*—Kimberly Wood
(74) *Attorney, Agent, or Firm*—Carothers & Carothers

(57) ABSTRACT

A modular suspension system for supporting conduit between structural members, such as walls studs or ceiling joists, of a building. The system includes a transverse support bracket for securement between the building structural members and further includes an elongate conduit segment of tubing and end mounts received over opposite ends of the conduit segment for securing the conduit segment to respective building structural members. The end mounts are constructed of tubular segments coaxially received over end portions of the conduit segment and these tubular segments have one or more ears protruding therefrom for securing the tubular segments to the building structural members. Clip members having clip base tubular segments are coaxially and slidably received over the conduit segments and a pair of resilient clip arms extend from the clip base tubular segment in spaced relationship and are dimensioned for embracing and retaining a conduit therebetween in biased engagement to suspend the conduit in a wall or ceiling structure.

1 Claim, 2 Drawing Sheets

CONDUIT BRACKET SYSTEM

BACKGROUND OF THE INVENTION

The present invention relates to a bracket system for suspending and securing conduits and the like, such as electrical and fluid conduits, including water and gas distribution support systems, between structural members for walls or ceilings of a building.

The pipe securement systems of the prior art are generally time consuming and/or expensive to install. Most generally conduits are suspended within the walls of a building structure between wall studs, or in the ceiling of a building structure between ceiling joists by a transverse member which is connected between studs or joist, such as a piece of wood 2 by 4 or other lumber, and then a clip in the general shape of a question mark is placed over the conduit and the clip is then secured to the transverse board by a screw or nail. Wood has become ever increasingly more expensive and in addition requires excessive time for nailing or screwing the wood support to the adjacent building structural members.

In other prior art installations, expensive metal brackets are constructed whereby they are telescopic in nature in order to spread to fit between adjacent structural members, such as wall studs or ceiling joists, and metal clips are provided which slide along the bracket and may be properly positioned to clip and retain conduits. These adjustable conduit bracket systems are exceedingly expensive.

It is a principal object of the present invention to provide an inexpensive conduit bracket system which is easy to install.

SUMMARY OF THE INVENTION

The modular suspension system of the present invention for supporting conduit or other structure between structural members of a building is comprised of a transverse support bracket for securement between building structural members and includes an elongate conduit segment of circular cross section, such as a segment of readily available plastic conduit, and end mounts received on opposite ends of the conduit segment for securing the conduit segment to respective building structural members, such as wall studs or ceiling joists. Accordingly, the main portion of the modular suspension system consists of a segment of plastic conduit which is readily found on the job site as excess scrap pieces of conduit which would otherwise be discarded. The end mounts are also preferably molded of plastic. The end mounts are comprised of tubular segments which are coaxially received over end portions of the conduit segments. These tubular segments have at least one ear protruding therefrom for securing the tubular segments of the end mounts to the building structural members to thereby suspend the conduit segment therebetween. The modular suspension system thus far described is in its simplest form and may be simply used in this fashion to, for example, support conduit and other elongated members running between ceiling joists.

The modular suspension system of the present invention may be further adapted to include clip members which are slidably received on the conduit segment for securing other conduit to this conduit segment which is supported between building structural members. These clip members are comprised of a clip base tubular segments which are coaxially received over the conduit segment and may slide therealong, and a pair of resilient clip arms extend from each clip base tubular segment in spaced relationship and are dimensioned for embracing and retaining a conduit therebetween in biased engagement. If desired, the clip members may be positioned and then glued there so that they do not thereafter move. For example, if the pipe consists of pvc, the clip members may be glued in position by applying a small amount of pvc glue. The clip members are also preferably molded of plastic in the same manner as the end mounts are molded. It is also preferable that the end mounts and the clip members are molded of the same plastic as is the elongate conduit segment so that associated parts of the modular system may be glued together if and when desired.

BRIEF DESCRIPTION OF THE DRAWINGS

Other objects and advantages appear hereinafter in the following description and claims. The appended drawings show, for the purpose of exemplification, without limiting the invention or appended claims, certain practical embodiments of the present invention wherein:

DETAILED DESCRIPTION OF THE PREFERRED EMBODIMENTS

Figure 1:
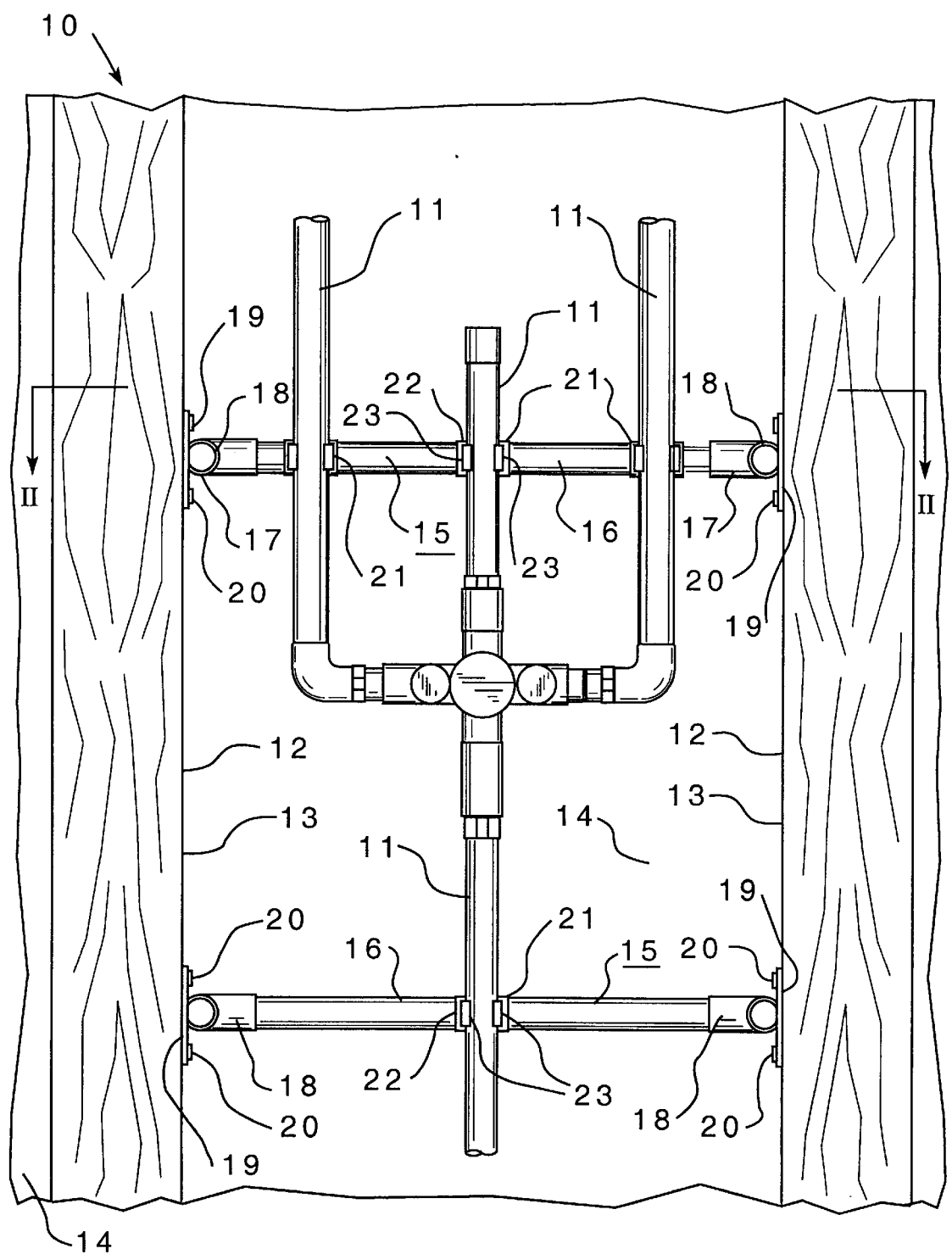
FIG. 1 is a view in front elevation illustrating one embodiment of the modular suspension system of the present invention for supporting conduit between structural members of a building.
Figure 2:
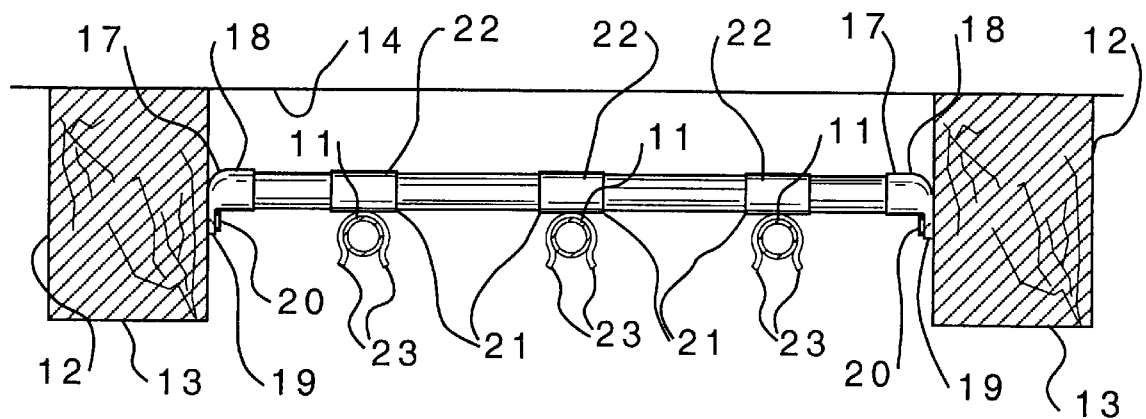
FIG. 2 is a view in horizontal cross section of the structure shown in FIG. 1 as seen long section line II—II.

Referring first to FIGS. 1 and 2, the modular suspension system 10 of the present invention is provided for supporting conduit 11 between structural members 12. Structural members 12 in this embodiment are spaced wooden wall studs 13 supporting outside wall structure 14.

The conduits 11 are supported between spaced vertical studs 13 by transverse support brackets 15 of the present invention which are secured between building structural members 12. Transverse support brackets 15 include elongate conduit segments 16 of circular cross section. These conduit segments 16 are scrap pieces of plastic water pipe or conduit left over from plumbing construction and are identical to the plastic conduits 11. The elongate conduit segments 16 are mounted at their ends to the building structural members 12 by end mounts 17 received on opposite ends of conduit segments 16 for securing the conduit segments 16 to respective building structural members 12.

End mounts 17 are molded of plastic and comprised of tubular segments 18 coaxially received on opposite ends of the conduit segments 16. The tubular segments 18 have an ear 19 protruding therefrom for securing the tubular segments 18 to building structural members 12. This is accomplished by the use of nails 20 which protrude through corresponding openings provided in the ears 19.

The modular suspension system 10 further includes clip members 21 which are slidably received on or over conduit segments 16 for securing other conduits 11 to conduit segment 16. Clip members 21 are comprised of clip base tubular segments 22 coaxially and slidably received over conduit segments 16 and a pair of resilient clip arms 23 extending from the clip base tubular segments 22 in spaced relationship and dimensioned for embracing and retaining a conduit piece 11 therebetween in biased engagement.

Figure 3:
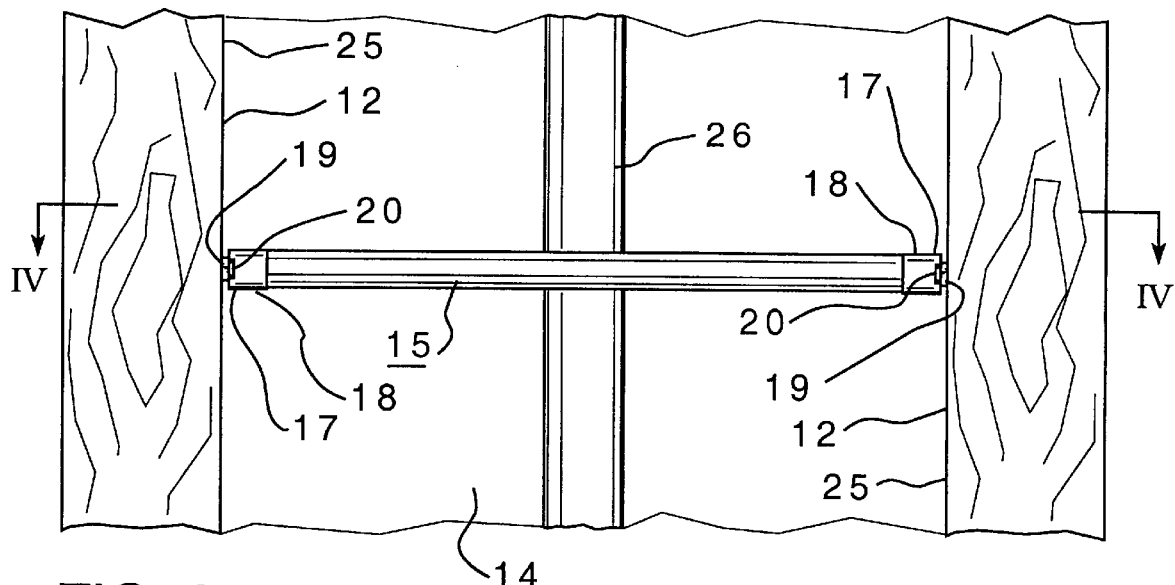
FIG. 3 is a bottom plan view of another embodiment of the module suspension system of the present invention as seen installed between ceiling joists and supporting a large conduit thereon.
Figure 4:
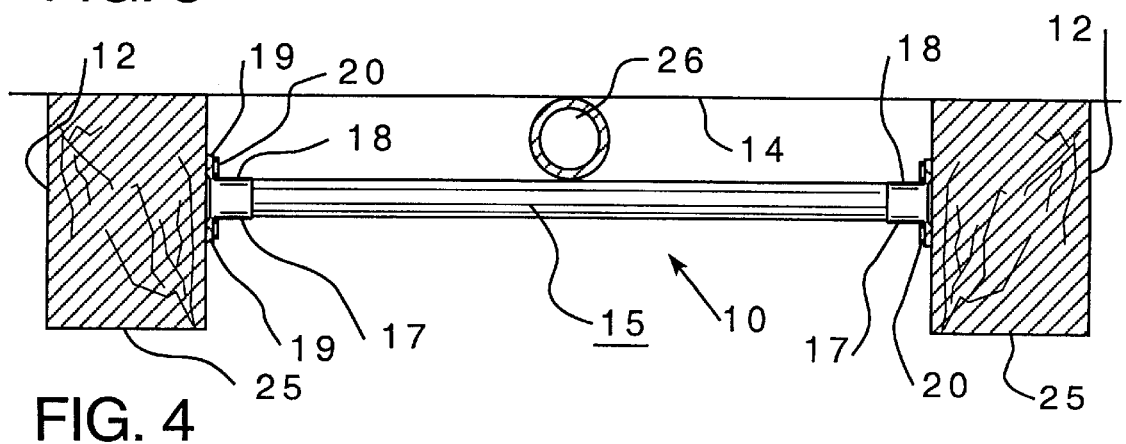
FIG. 4 is a view in vertical cross section of the structure illustrated in FIG. 3 as seen along section line IV—IV.

The embodiment of FIGS. 3 and 4 is designated with the same reference numerals and varies only from the structure shown in FIGS. 1 and 2 in that the clip members 21 are not utilized, but may be utilized if desired, and also varies in the fact that the end mounts 17 are of slightly different structure. The primary difference in the end mounts 17 of the structure shown in FIGS. 3 and 4 is that the tubular segments 18 are each provided with two opposing ears 19 for securement to adjacent structural members 12, which in this instance are horizontal ceiling joists 25.

In this embodiment, the transverse support bracket 15 supports a conduit 26 thereon, which conduit runs between the ceiling joists 25. Accordingly, in this embodiment the use of clip members 21 is not required.

I claim:

1. A modular suspension system for supporting conduit between structural members of a building, the system comprising:

a transverse support bracket for securement between opposed faces of said building structural members and including an elongate plastic tube segment of circular cross section and end mounts received on opposite ends of said tube segment for securing said tube segment to respective opposed faces of said building structural members;

said end mounts comprised of plastic tubular segments coaxially received over end portions of said elongate tube segment, said tubular segments each having at least one ear protruding therefrom at right angles from the axis of said tubular segment for securing said tubular segments to said opposing faces of said building structural members; and clip means slidably received on said elongate tube segment for securing other conduit to said elongate tube segment, said clip means comprised of a clip base of plastic tubular segment coaxially received over said elongate tube segment and a pair of plastic resilient clip arms extending directly from said clip base tubular segment in spaced relationship and dimensioned for embracing and retaining a conduit therebetween in biased engagement for suspended support.

* * * * *